(12) United States Patent
Zuckerman et al.

(10) Patent No.: US 11,238,891 B1
(45) Date of Patent: Feb. 1, 2022

(54) MAGNETIC RECORDING HEAD WITH READER AND WRITER OFFSET IN A CROSS-TRACK DIRECTION

(71) Applicant: Seagate Technology LLC, Fremont, CA (US)

(72) Inventors: Neil Zuckerman, Eden Prairie, MN (US); Xiong Liu, Timah (SG); Raul Andruet, Woodbury, MN (US); Lihong Zhang, Clementi (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/067,219

(22) Filed: Oct. 9, 2020

(51) Int. Cl.
| | |
|---|---|
| *G11B 5/00* | (2006.01) |
| *G11B 11/10* | (2006.01) |
| *G11B 5/127* | (2006.01) |
| *G11B 5/60* | (2006.01) |

(52) U.S. Cl.
CPC ............ *G11B 5/1278* (2013.01); *G11B 5/607* (2013.01)

(58) Field of Classification Search
CPC ... G11B 5/1475; G11B 5/3133; G11B 5/6076; G11B 5/6011; G11B 5/024; G11B 5/10; G11B 5/00826; G11B 5/484; G11B 5/315; G11B 5/3173; G11B 11/105; G11B 2005/0021; G11B 11/10
USPC .......... 360/75, 121, 125.05, 125.04, 59, 328
See application file for complete search history.

(56) References Cited

U.S. PATENT DOCUMENTS

| | | | |
|---|---|---|---|
| 7,537,682 B2 | 8/2009 | Pust et al. | |
| 8,432,636 B2 | 4/2013 | Brand | |
| 8,456,969 B1 | 6/2013 | Mooney et al. | |
| 8,523,312 B2 | 9/2013 | Zheng et al. | |
| 9,123,381 B2 | 9/2015 | Anaya-Dufresense et al. | |
| 9,934,807 B2* | 4/2018 | Macken | G11B 5/3133 |
| 10,418,054 B1* | 9/2019 | Liu | G11B 5/1475 |

* cited by examiner

*Primary Examiner* — Nabil Z Hindi
(74) *Attorney, Agent, or Firm* — Kagan Binder, PLLC

(57) ABSTRACT

Described are magnetic recording heads that include a read transducer and a write transducer, with the two transducers being arranged in a side-by-side configuration.

20 Claims, 8 Drawing Sheets

MAGNETIC RECORDING HEAD WITH READER AND WRITER OFFSET IN A CROSS-TRACK DIRECTION

FIELD

The invention is in the field of magnetic recording heads that include a read transducer and a write transducer, with the two transducers being arranged in a side-by-side configuration.

BACKGROUND

In a magnetic data storage and retrieval system, a magnetic head (a.k.a. a "read-write head," "magnetic recording head," "transducers," or the like) typically includes a writer portion, which includes a writer for storing (writing) magnetically-encoded information onto a magnetic recording medium, and a reader portion, which includes a reader for retrieving (reading) the magnetically-encoded information from the magnetic recording medium. To write data, an electrical current is caused to flow through a conductive coil to induce a magnetic field in the writer. By reversing the direction of the current through the coil, the polarity of the data written to the magnetic media is also reversed.

The magnetic head is part of a larger structure, referred to as a slider, which includes a surface (referred to as an "air-bearing surface") that opposes a surface of the magnetic recording medium during operation of the magnetic data storage and retrieval system. The slider positions the magnetic recording head in close proximity to the magnetic recording medium, via the air-bearing surface. The slider is suspended above the magnetic recording medium by a cushion of gas (e.g., air, helium) that is caused to flow between the air-bearing surface and the magnetic recording medium by rotation of the rotating magnetic recording medium. The distance between the magnetic head and a surface of the magnetic recording medium is preferably small enough to allow for writing to and reading from the magnetic recording medium with a large areal density, while large enough to prevent contact between the magnetic recording medium surface and the magnetic head. Performance of the magnetic head depends in large part on head-media spacing (HMS). High density recording preferably requires a small HMS and a low fly height (the height of the slider above the magnetic recording medium surface).

Many commercial magnetic head designs contain an additional system to that allows for more precise control of the distance between a reader or a writer, and a recording medium. These systems are used to selectively and controllably cause a reader or a writer to protrude a small distance away from the slider surface in a direction toward the magnetic recording medium, during an operation that is performed by the reader or the writer. This type of controlled movement of a reader or a writer is referred to as "protrusion," and may be produced by any useful mechanism ("protrusion controller") and related structure of a slider, such as by a piezoelectric device, a heater (an "electrothermal" heater), or another type of protrusion controller that is effective to cause a desired protrusion of the reader or writer away from a surface of the magnetic head. The protrusion mechanism is effective to cause protrusion of a reader or a writer to selectively reduce a distance between the reader or the writer, during reading or writing, respectively.

As an example actuator to cause protrusion of a reader or a writer, a heater actuator heats a specific portion of a magnetic head at a location of the reader or the writer to cause a controlled amount of thermal expansion of the portion of the magnetic head. The controlled thermal expansion causes a portion of the magnetic head to expand in size in a manner that reduces the distance between a reader or the writer and the magnetic recording medium surface.

SUMMARY

Desirably, a magnetic recording head can include independent actuation of a reader relative to a writer, to provide desired or independent distancing of the reader and the writer from the magnetic recording medium during operation, i.e., independent protrusion of the reader relative to the writer. In particular, when the reader is in use, a read actuator desirably causes protrusion of the reader without causing undue protrusion of the writer. Likewise, when the writer is in use, a write actuator desirably causes protrusion of the writer without causing undue protrusion of the reader.

In one aspect, the invention relates to a recording head. The recording head includes a bottom surface adapted to be oriented to face a magnetic recording medium surface during use. The bottom surface includes: a down-track dimension between a leading end and a trailing end, a cross-track dimension perpendicular to the down-track dimension, a write transducer located at a location of the down-track dimension and the cross-track dimension, and a read transducer located at a location of the cross-track direction that is spaced a distance of at least 10 microns from the location of the writer in the cross-track dimension.

Figure 1:
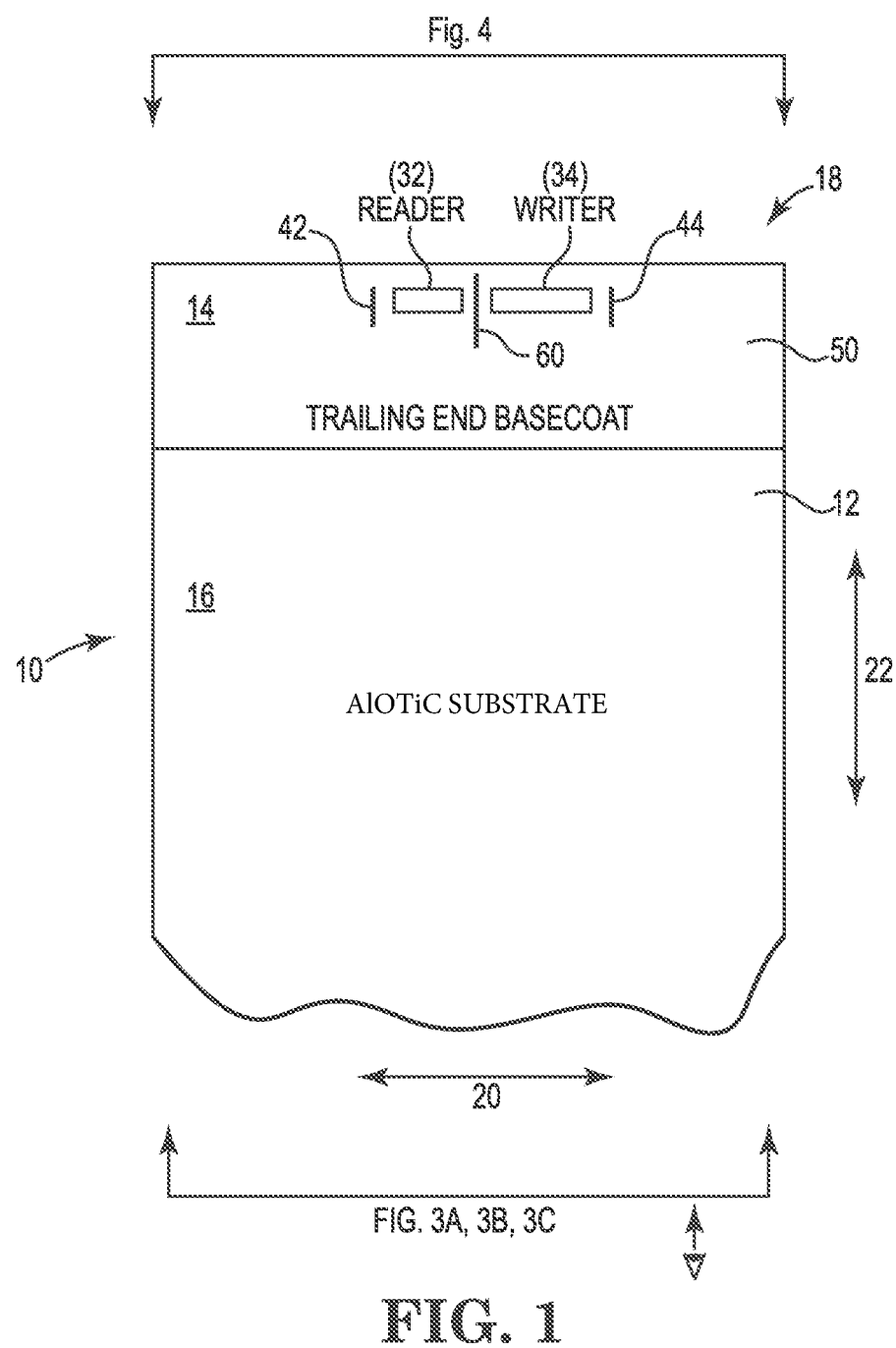
FIG. 1 is a schematic representation of an example recording head as described.

All figures are schematic, illustrative, non-limiting, and not necessarily to scale.

DETAILED DESCRIPTION

The following description relates to magnetic heads (a.k.a. "magnetic recording heads") that include a magnetic recording mechanism and a magnetic reading mechanism built into the head. The description also relates to hard disk drives that include a magnetic head of this description, and to methods of using the magnetic heads and hard disk drives to record, store, and read data.

The magnetic heads include a "write transducer," and the reading mechanism includes a "read transducer." The read transducer and the write transducer, respectively, are structures of the magnetic head that each interact, independently, with the magnetic recording medium to read or write bits of data magnetically to and from the medium.

The magnetic head incorporates into its structure an "air-bearing surface" (ABS) that precisely controls the location (distance) of the magnetic head to be in very close proximity to a recording surface of a magnetic recording medium. This spacing between the magnetic head and the surface of the magnetic recording medium is referred to as "fly height."

In addition to an air-bearing surface to control fly height, a magnetic head also includes one or more additional features to add further precision control of the distance between the read transducer and the magnetic recording medium surface, and to independently provide further precision control of the of the distance between the read transducer and the magnetic recording medium surface. This additional control feature is accomplished by a mechanism that selectively causes a surface portion of the magnetic recording head that is associated with a read transducer or a write transducer, to protrude from the surface of the magnetic recording head, toward the magnetic recording medium surface, to reduce the spacing between the transducer and the surface. This type of control feature is referred to herein as a "protrusion controller," and may be of various known designs, such as a thermos-resistive design or a piezoelectric design. Examples of protrusion controllers that include a thermos-resistive heater embedded in a magnetic recording head, to selectively cause protrusion of a write transducer of a read transducer, are described at U.S. Pat. Nos. 7,573,682, 8,432,636, the entireties of each being incorporated herein by reference.

Desirably, during operation, actuating a protrusion controller of one transducer (e.g., the write transducer) (the "actuated transducer") can result in a desired degree of protrusion of that transducer, without simultaneously causing an undesired degree of protrusion of another transducer (e.g., the read transducer) (the "non-actuated transducer"). Incidental protrusion of the a non-actuated transducer reduces the spacing between the non-actuated transducer and a surface of an adjacent magnetic recording medium, resulting in an increased potential for contact between the non-actuated transducer and the surface of the magnetic recording medium.

According to the present description, a magnetic recording head is designed to reduce the undesired, inadvertent effect of protrusion of an actuated transducer on a non-actuated transducer. Example magnetic recording heads are configured to locate a read transducer at a location that is spaced from a write transducer in a cross-track direction; this is referred to as the read transducer and the write transducer being in a "side-by-side" configuration. Additionally, but optionally, example magnetic recording heads also include a spacer layer (or a "barrier layer") disposed between the read transducer and the write transducer. The spacer layer has properties such as thermal conductivity, a coefficient of thermal expansion, and flexibility, that may reduce the effect that protrusion of an activated transducer has on a non-activated transducer; a useful or preferred spacer layer may reduce the degree of protrusion of a non-activated transducer that may occurs upon actuating a protrusion controller of an activated transducer to cause protrusion of the activated transducer.

A magnetic recording head of the present description is a microelectronic component of a hard disk drive that during use is positioned above a spinning magnetic disk (a type of "magnetic recording medium"), at which position the magnetic recording head can write or read data onto or from the disk. The recording head includes at least one transducer that can sense a magnetic field and convert the field into an electrical current (a "read transducer"), and at least one transducer that can transform electrical current into a magnetic field that can magnetically record data onto the disk (a "write transducer").

A hard disk drive contains a gaseous interior atmosphere that contains a gaseous fluid that flows past the air-bearing surface of a magnetic recording head during use, due to the movement of the disk past the air-bearing surface in the fluid environment. The gaseous fluid may be air or may be a low density gas such as helium, which has a density that is substantially lower than that of air, e.g., a density of about one-seventh the density of air. The interior may also contain a mixture of helium with air or another gas, e.g., a concentrated helium environment such as at least 70, 80, or 90 percent helium by volume. The spinning disk causes movement of the gaseous fluid at the disk surface, and the moving fluid impacts the air-bearing surface of the magnetic recording head to produce specific forces on various surfaces of the air-bearing surface. Desirably, the moving fluid impacts the air-bearing surface to cause a desired fly height and stability of the magnetic head during use.

During operation of a hard disk drive, the magnetic head will "fly" above the surface of the spinning magnetic disk with a clearance (i.e., "fly height") that may be as little as three nanometers, e.g., less than 1 nanometer under active conditions. The fly height is affected by the design of the air-bearing surface on the disk-facing surface of the magnetic recording head. The role of the air-bearing surface is to maintain a relatively constant fly height and stable orientation of the magnetic head as the head remains positioned above the moving surface of the spinning magnetic disk. If the head contacts the spinning surface of the disk, a catastrophic head crash may result. If the head and its transducers are positioned too far from the disk, reading and writing functionalities are inhibited. Additionally, if a magnetic head gets too close to the disk, abrasion and wear may remove a protective coating of the head and cause long-term failure, for example due to corrosion of un-protected metals.

Example magnetic recording heads of the present description relate to designs of hard disk drive magnetic recording heads that include a read transducer and a write transducer, with the read transducer and the write transducer being located in a "side-by-side" configuration, meaning that the read transducer and the write transducer are located at substantially different locations along a width (cross-track direction) of the magnetic recording head. In example magnetic recording heads the location of the reader in the cross-track direction is spaced at least 10 microns from the location of the writer in the cross-track direction.

For example, a recording head of the description includes a leading end, a trailing end, and a length wise dimension between the leading end and the trailing end, this dimension also being referred to as a "down-track" dimension. The recording head also has a width direction that is perpendicular to the down-track dimension, this dimension being referred to as a "cross-track" dimension. The recording head includes a bottom surface, which is a surface that faces a surface of a magnetic recording medium during use. The bottom surface includes an air-bearing surface and a trailing end surface. At the trailing end surface, embedded within an insulative material of the magnetic recording head, are a read transducer and a write transducer, as well as other structures that are adapted to allow for operation of the read transducer and the write transducer.

Referring to FIG. 1, illustrated is a view of a bottom surface 12 of a slider 10, which includes a trailing end 18 a leading end (not specifically shown) spaced from the trailing end in down-track direction 22. Bottom surface 12 includes a first portion that is an air bearing surface 16, and a second portion that is a trailing end surface 14 located at trailing end 18. Slider 10 has a cross-track dimension 20 and a down-track dimension 22 that is perpendicular to the cross-track dimension.

End surface 14 is made of a ceramic "basecoat" material (50), which is also insulative. Embedded within ceramic material 50, beneath trailing end surface 14 are a read transducer 32 and a write transducer 34. Read transducer 32 is located at a substantially different location along cross-traction direction 20 compared to write transducer 34, e.g., as measured from center-to-center of the two transducers. In example magnetic recording heads, the location of a read transducer in the cross-track direction is spaced at least 10 microns from the location of a write transducer in the cross-track direction, e.g., a location of a read transducer in the cross-track direction may be spaced a distance of from 10 microns to 100 microns from location of the write transducer in the cross-track direction.

In down-track direction 22, read transducer 32 can be located at a useful position of surface 14 relative to write transducer 34, e.g., as measured from center-to-center of the two transducers. In example magnetic recording heads, a location of the reader (32) in the down-track direction may be substantially aligned with the location of the writer (34) in the down-track direction, e.g., the location of the reader and the location of the writer may be spaced by not more than 50 microns measured in the down-track direction. As a more specific example, a location of a writer (34) may be spaced from a location of a reader 32, in the down-track direction, by a distance that is less than 50 microns, e.g., less than 10 or 5 microns, such as in a range from 1 to 5 or 1 to 3 microns.

Also shown at FIG. 1 are a first protrusion controller 42 associated with read transducer 32, and a second protrusion controller 44 associated with write transducer 34. The first protrusion controller 42 can be adapted to be actuated, during operation of read transducer 32, to cause protrusion of read transducer 32 at surface 14 in a direction away from trailing end surface 14, i.e., in a direction toward a magnetic recording medium. The second protrusion controller 44 can be adapted to be actuated, during operation of write transducer 34, to cause protrusion of write transducer 34 at surface 14 in a direction away from trailing end surface 14, i.e., in a direction toward a magnetic recording medium. Each protrusion controller 42, 44 may be of any useful design, such as in the form of a thermo-resistive protrusion controller, a piezoelectric protrusion controller, or an alternate design.

Still referring to FIG. 1, read and write transducers 32 and 34, and protrusion controllers 42, 44, are each embedded in a first ceramic material 50. Ceramic material 50, also an insulating material, can be a material that is known to be useful as a structure of a magnetic recording head, at a trailing end, to embed and surround functional structures such as read transducers, write transducers, associated heaters, shields, and poles (e.g., a return poles), etc. One specific non-limiting example of a useful ceramic basecoat material (50) of a read head as described, to embed these structures, is aluminum oxide (alumina, $Al_2O_3$).

Also shown as part of slider 10 of FIG. 1 is spacer 60 (or "barrier" 60), which is a narrow layer of material that is different from the ceramic (insulative) material 50 of slider 10. Spacer 60 is an amount of material that is disposed between read transducer 32 and write transducer 34, and that extends substantially in a down-track direction. Spacer 60 can have a length that extends in down-track direction 22 that is in a range from 0.5 to 40 microns, e.g., from 1 to 20 microns or from 5 to 15 microns. Spacer 60 can have a width that extends in cross-track direction 22 that is in a range from 0.5 to 100 microns, e.g., from 1 to 50 microns, such as from 4 to 20 microns. A third dimension (height) of the spacer can be, e.g., in a range from 1 to 400 microns, e.g., from 2 to 100 microns.

Spacer 60, included between the transducers, may be effective to reduce the degree to which protrusion of an actuated transducer may cause a concomitant, unwanted protrusion of a non-actuated transducer. For one example purpose, a spacer 60 may function as a thermally-insulative heat energy barrier between a read transducer and a write transducer, and between one or more heater-type protrusion controllers that are independently associated with the transducers. In this capacity, in a magnetic recording head that uses one or more heaters as a protrusion controller to heat a region of the magnetic recording head near a read or write transducer to cause controlled protrusion of the transducer, the controlled and intended protrusion that occurs at a region of one of the transducers (e.g., a write transducer of slider 10 of FIG. 1) preferably does not cause an undesirable degree of protrusion at a different transducer (e.g., a read transducer of slider 10 of FIG. 1). In other words, actuation of a heater or another type of protrusion controller at one transducer to cause protrusion at a region of the transducer preferably does not cause incidental, unintentional, and unwanted protrusion at the other transducer. Such incidental protrusion of the second transducer would reduce the spacing between the second transducer (e.g., a surface of the transducer that is part of a bottom surface (14) of a slider) and an opposed surface of an adjacent magnetic recording medium, resulting in an increased potential for contact between the surface of the second transducer and the surface of the magnetic recording medium.

Spacer 60 can inhibit and reduce an amount heat energy that is transmitted from a heater located at one of the transducers (e.g., at the write transducer) to a region of another transducer (e.g., a read transducer) of a slider, with the transducers being oriented in a side-by-side arrangement as described herein and the spacer being located between the two transducers. A spacer 60 may be made of a material that has a thermal conductivity that is less than the thermal conductivity of ceramic (insulative) material 50 within which the transducers and protrusion controllers of slider 10 are otherwise embedded. A desired thermal conductivity of a material of spacer 60 may be below about 2 watts per meter-K (W/m-K), e.g., below 1.5 W/m-K or below about 1 W/m-K.

Spacer 60 can also exhibit a desired physical property relative to surrounding ceramic (insulative) material 50 in which the read and write transducers are embedded. For example, spacer 60 may be made of material that has a higher degree of elasticity compared to the elasticity of ceramic material 50. Elasticity may be measured by Young's Modulus. A material of a spacer 60 may have a higher elasticity (i.e., lower stiffness) compared to the material 50 will have a lower Young's Modulus compared to a Young's Modulus of material 50. A useful or preferred spacer 60 may be made of a material that has a Young's Modulus that is below 60 gigapascals (GPa), such as below 20 gigapascals, e.g., in a range from 1 to 10 gigapascals.

Additionally or alternately, spacer 60 can also exhibit a coefficient of thermal expansion (CTE) that may reduce an effect of protrusion of an actuated transducer, on a non-actuated transducer. A spacer 60 may be made of a material that has a coefficient of thermal expansion that is lower than the coefficient of thermal expansion of ceramic (insulative) material 50 within which the transducers and protrusion controllers of slider 10 are otherwise embedded. A desired coefficient of thermal expansion of a material of spacer 60 may be below about $10 \times 10^{-6}$/K, e.g., in a range from 1 to $5 \times 10^{-6}$/K.

Examples of materials that may be useful or preferred as a material of spacer 60, which may exhibit one or more of a useful or preferred thermal conductivity, elasticity (e.g., as measured by Young's Modulus), or coefficient of thermal expansion as described, include a variety of different materials that may be a ceramic, a non-ceramic material, a polymeric material, or glassy material. A material may not exhibit all three of these properties in a range specified as being preferred, but may preferably exhibit at least one and possibly two, with a preferred spacer material having a Young's Modulus as described and optionally having a one of a thermal conductivity or a CTE as specified.

Specific examples of materials that may be useful as a spacer material may include glassy alumina, glassy silicon dioxide, and polymeric materials such as polyimide, and polymer materials that are useful as photoresist materials in semiconductor and microelectronic device processing.

As another optional feature of slider 10 of FIG. 1, which is not specifically shown at FIG. 1, one or more resistive temperature sensors can be included in a magnetic recording head. A resistive temperature sensor can be adapted to sense, during operation of a hard disk drive, changes in spacing between the resistive temperature sensor and a magnetic recording medium located an operative distance from a bottom surface of the magnetic recording head. A resistive temperature sensor can be located at a read transducer or at a write transducer of a magnetic recording head. A magnetic recording head may include one single resistive temperature sensor at a write transducer, one single resistive temperature sensor at a read transducer, or may include both a resistive temperature sensor at a write transducer and a resistive temperature sensor at a read transducer. The sensor is configured to operate at a temperature that is above an ambient temperature, and the sensor is responsive to both the changes in spacing between the sensor and the medium, and contact between the sensor and the medium.

In more detail, a resistive temperature sensor can be designed and operated by known principles, for example as described in U.S. Pat. No. 9,123,381, the entirety of which is incorporated herein by reference. As described therein, a resistive temperature sensor can be positioned at a location on a transducer of a recording head, e.g., at or near the "close point" of the transducer (see FIG. 2 and related text). The resistive temperature sensor may be a sensor that has a temperature coefficient of resistance (TCR), and may be referred to herein as a TCR sensor. During use of a magnetic recording head that includes a transducer (read or write transducer) and a protrusion controller that can be actuated to cause protrusion of the transducer, actuation of the transducer can be performed by a protrusion controller, which may be a thermos-resistive heater. Also during operation, bias power can be applied to the TCR sensor to raise the surface temperature of the sensor and adjacent portion of the transducer to be substantially higher than the temperature of the magnetic recording medium.

The TCR sensor may be configured to sense changes in heat flow that are indicative of an onset of contact between the recording head and the adjacent magnetic recording medium. Details concerning head-media spacing and contact determinations in accordance with various embodiments of the disclosure are provided in U.S. Pat. No. 8,523,312, the entirety of which is incorporated herein by reference.

During operation of a hard disk drive, with a spinning disk passing by a surface of a magnetic recording head as described herein, in the absence of contact between the surface of the recording head the surface of the disk, a gap (e.g., an "air gap") is present between the recording head surface (having an elevated temperature) and the disk surface (having a relatively lower temperature). The transducer of the magnetic recording head, the air gap, and the magnetic recording disk define one level of heat transfer rate. When the transducer of the recording head comes into contact with the disk surface, such as after activation of the thermal actuator or heater of a protrusion controller, contact between the high thermal conductivity materials of the transducer and the disk will significantly increase the heat transfer rate. As such, the TCR sensor on the transducer senses a drop of temperature or an excursion of temperature trajectory, allowing for detection of contact between the recording head transducer and the magnetic media surface.

Example magnetic recording head 10 of FIG. 1 may be one of a variety of known types, such as a heat-assisted magnetic recording head (HAMR), also referred to as energy-assisted magnetic recording (EAMR), thermally-assisted magnetic recording (TAMR), and thermally-assisted recording (TAR). This technology uses a laser source and a near-field transducer (NFT) as part of the magnetic recording head, to heat a small spot on a magnetic disk medium during recording. The heat reduces magnetic coercivity of the magnetic recording medium at the spot, which allows the write transducer to change the orientation of a magnetic domain at the spot. Other types of recording heads that are not HAMR magnetic recording heads include those referred to as perpendicular magnetic recording (PMR) configurations. Examples of HAMR recording heads are described in U.S. Pat. No. 8,456,969, the entirety of which is incorporated herein by reference.

Figure 2:
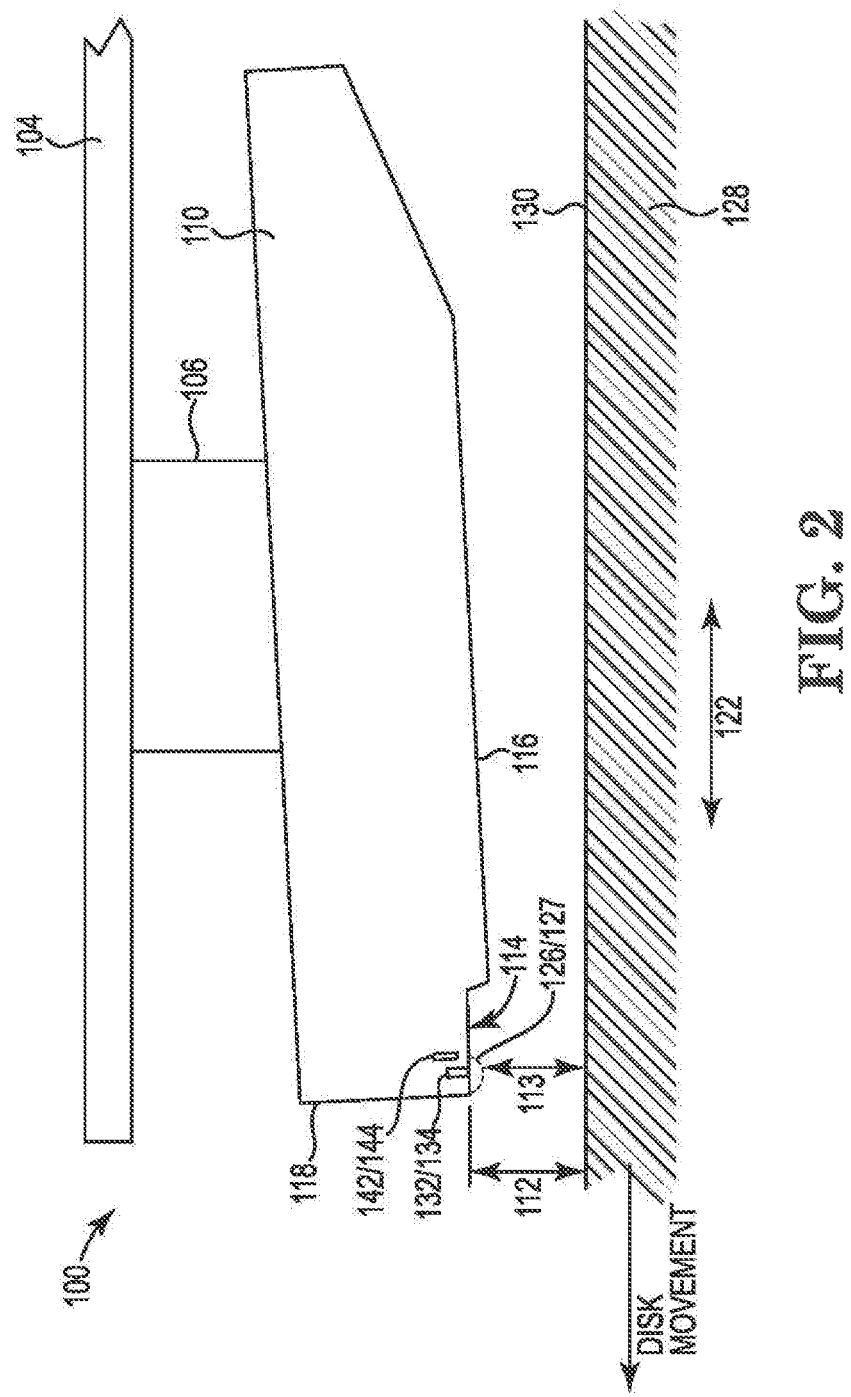
FIG. 2 is a side view of a magnetic recording head (slider) as described relative to a magnetic recording medium.

Referring to FIG. 2, a schematic block diagram shows a side view of a recording head arrangement 100 that includes example slider 110 viewed in a cross-track direction relative to down-track direction 122. Slider 110 may be used in a magnetic data storage device, e.g., a hard disk drive (HDD). Slider 110 may also be referred to as a "recording head," a "write head," or a "read/write head." Slider 110 is coupled to head suspension assembly 104 at joint 106, which may include adhesive. Slider 110 includes at least one writer (or "read transducer") 132 and at least one writer (or "write transducer") 134, each embedded in ceramic material at trailing end surface 114.

A read head of the present description includes both a read transducer and a write transducer, and these are substantially aligned in a side-by-side configuration as described herein, i.e., when the two transducers are viewed from a side of the slider in a cross-track direction as shown at FIG. 2. To reflect that the read transducer and the write transducer are substantially aligned when viewed as illustrated at FIG. 2, FIG. 2 shows read transducer 132 and write transducer 134 using the designation 132/134, at substantially the same location in down-track direction 122 of the slider. Similarly, to reflect that protrusion controllers (e.g., heaters, one of which is associated with the read transducer and one of which is associated with the write transducer) are also substantially aligned when viewed as illustrated at FIG. 2, FIG. 2 shows protrusion controller (e.g., heater) 142 that is associated with read transducer 132, and protrusion controller (e.g., heater) 144 that is associated with read transducer 134, as a designation 142/144.

During use, transducers 132 and 134 are held proximate to surface 130 of magnetic recording medium 128, e.g., a magnetic disk. When slider 110 is located over surface 130 of recording medium 128, a fly height 112 is maintained between slider 110 and surface 130 in part by a downward force provided by suspension 104. This downward force is counterbalanced by a cushion of moving gas (e.g., air, helium and other mixed gases) that exists between surface 130 and air bearing surface (ABS) 116 (also referred to herein as a "medium-facing surface") of slider 110 when recording medium 128 (e.g., disk) is rotating. It is desirable to maintain a predetermined slider fly height 112 over a range of disk rotational speeds during both reading and writing operations to ensure consistent performance.

Region 126 is a region of surface 114 that is associated with write transducer 134. Region 127 is a region of surface 114 that is associated with write transducer 132. Regions 126 and 127 are each considered a "close point" of slider 110, which is generally understood to be a location of closest (minimum) spacing between a read transducer 132 or a write transducer 134 of slider 110, and surface 130 of recording medium 128, during use. This minimum separation between a transducer and surface 130 occurs during operation of the transducer, with protrusion of the transducer from surface 114 caused by actuating a protrusion controller.

Slider 110, as illustrated, includes protrusion controllers 142 and 144 that can be actuated to cause controlled movement (protrusion) of read transducer 132 or read transducer 134, respectively, relative to surface 114, during use, to independently effect fine control of the spacing 113 between each transducer 132, 134 and surface 130 during operation. One example of a protrusion controller can be a thermo-resistive heater built into slider 110 at a location that is effective to produce controlled thermo-resistive heating and controlled thermal expansion of the ceramic material of slider 110 that is located adjacent to read transducer 132 or read transducer 134, at surface 114. Selective and controlled heating of the ceramic material that is located adjacent to the read transducer or the write transduce will cause a local protrusion of the read transducer the read head, or of the write transducer of a write head, due to thermal expansion of the material. The degree of protrusion can be finely controlled to maintain a desired clearance 113 between the read transducer and the write transducer, and surface 130 of recording medium 128.

The portions of the magnetic recording head that are subject to controlled thermal expansion and protrusion typically include a region at surface 114 that is proximate the write transducer, and, independently, a region proximate the read transducer. Each of these regions, when thermally activated, becomes a region 126 or 127 that is a location of a protrusion of surface 114 of slider 110 in a direction of surface 130 of recording medium 128. To account for variations in slider fly height 112, slider 110 is configured such that protrusion of each region 126 and 127 can be independently effected during operation to finely adjust spacing 113 between read head 132 and write head 134. This is shown in FIG. 2 by the dotted line that represents a change in geometry of regions 126 and 127. In this example, the geometry change may be induced, in whole or in part, by an independent increase or decrease in temperature of the region 126 or 127 via a protrusion controller 142, 144 that includes a heater.

Figure 3A:
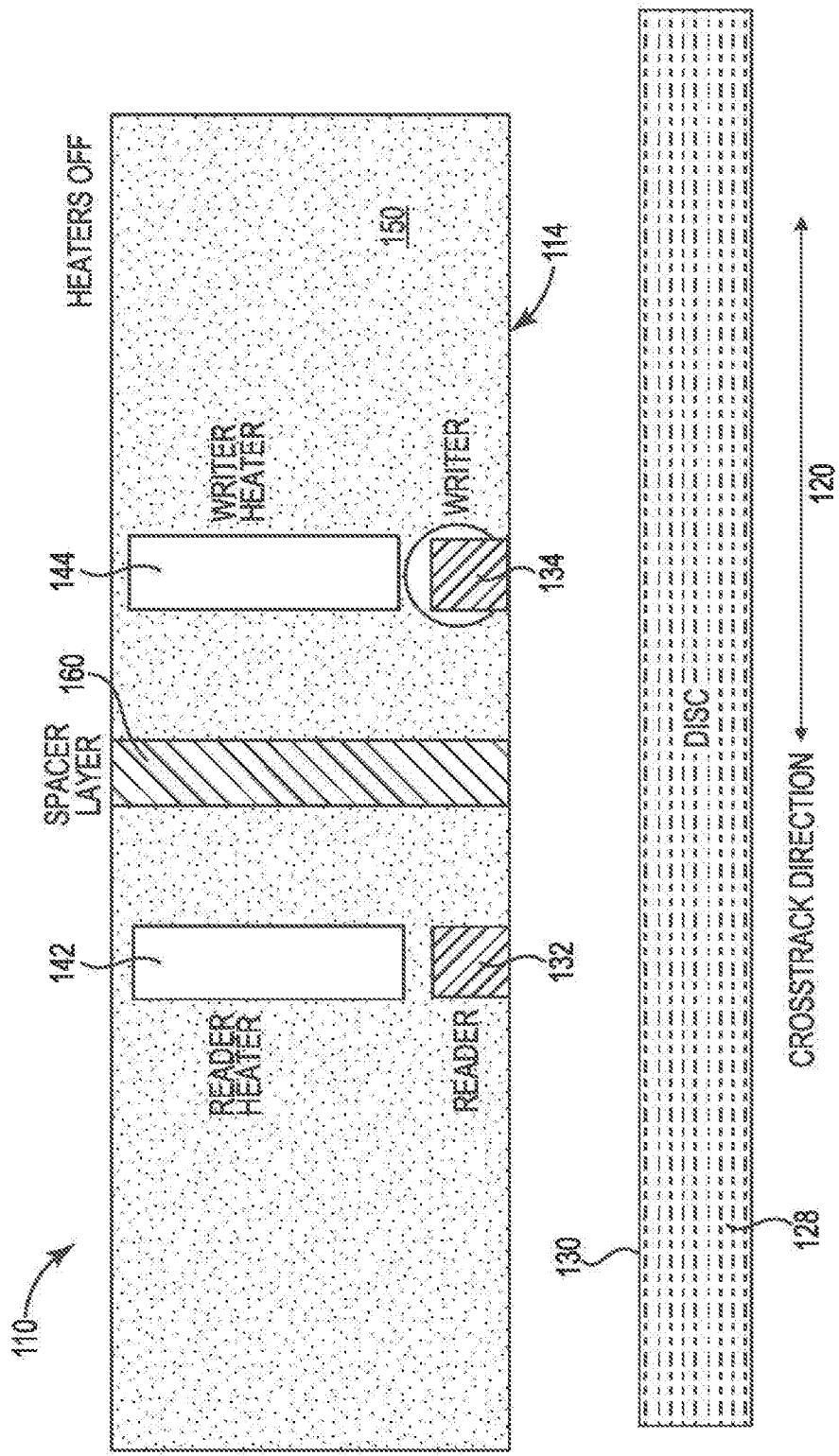
FIGS. 3A, 3B, and 3C are cross-sectional views of a magnetic recording head as described, with details of feature of locations of read and write transducers, including during operation of the magnetic recording head.
Figure 3B:
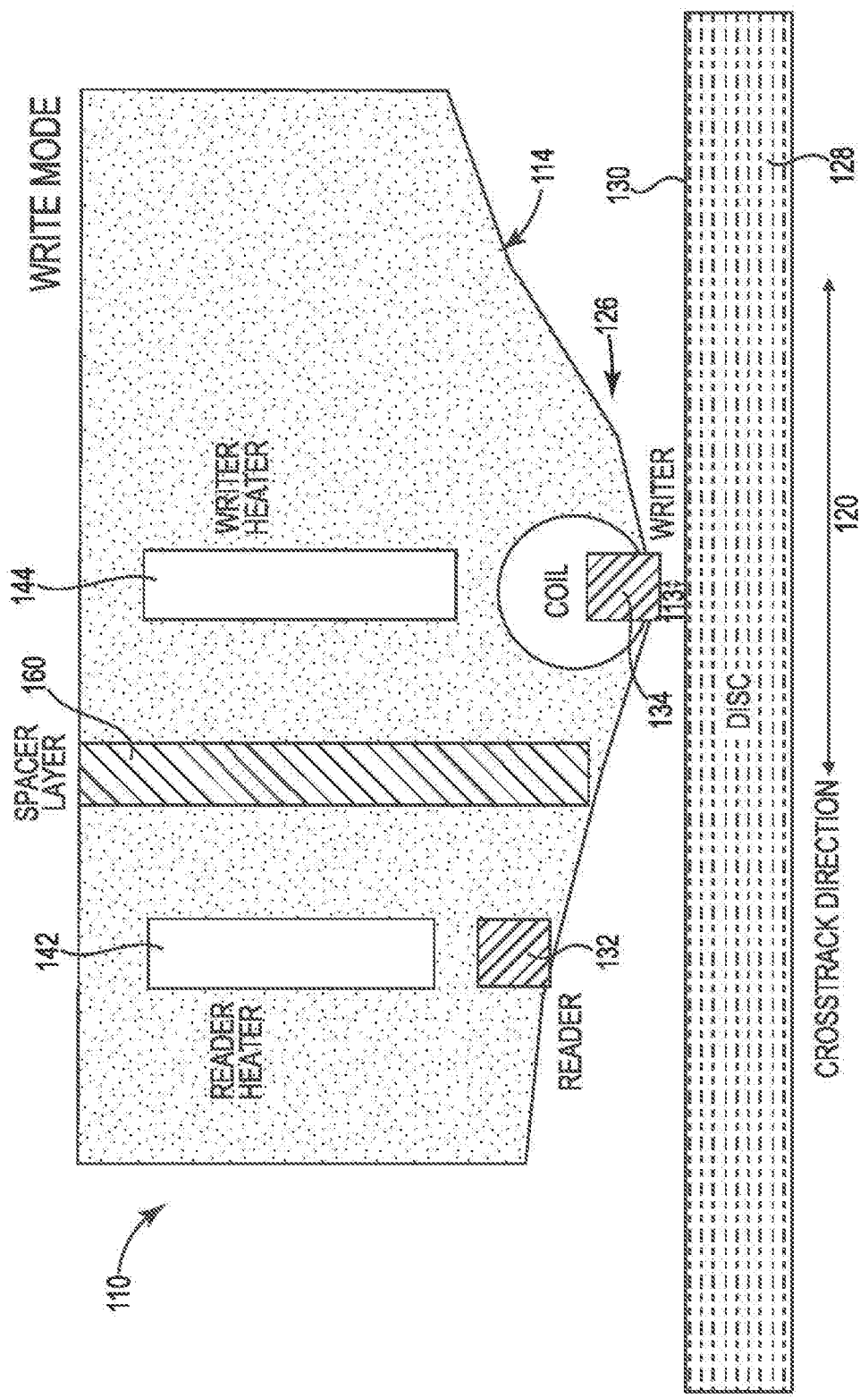
Figure 3C:
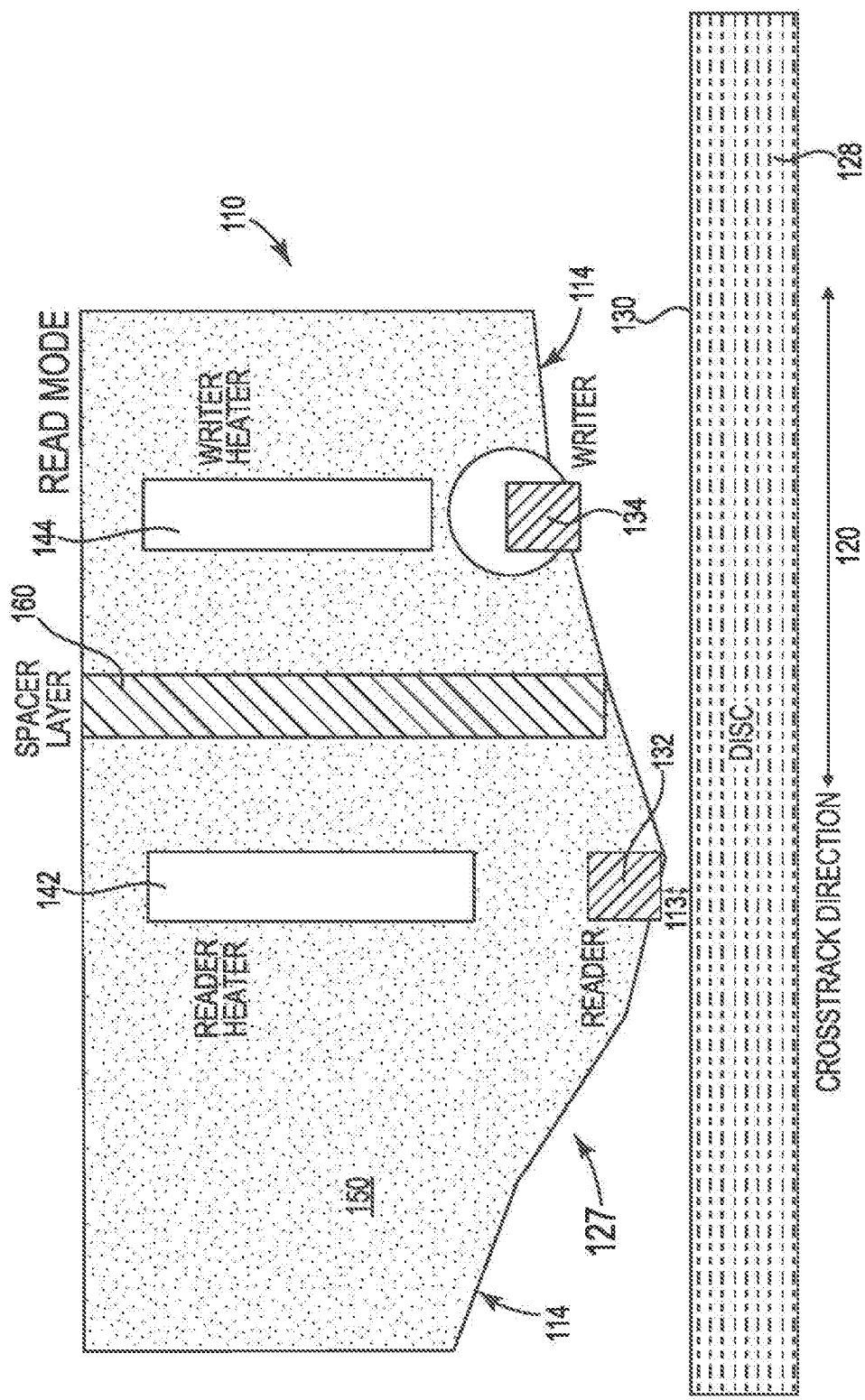

Referring now to FIGS. 3A, 3B, and 3C, each is a cut-away view of slider 110 viewed in a down-track direction, toward a trailing end of slider 110 viewed from the (opposite) leading end of slider 110. Slider 110 includes read transducer 132 and write transducer 134, each embedded in ceramic material 150 at trailing end surface 114. Associated with each of read transducer 132 and write transducer 134 is read protrusion controller 142 (e.g., a heater) and write protrusion controller 144 (e.g., a heater), each of which can be actuated to cause protrusion (relative to surface 114) of read transducer 132 and, independently, to cause protrusion of write transducer 132, respectively.

FIG. 3A shows slider 110 and structures thereof with each of protrusion controllers 142 and 144 in a non-actuated state, such that neither of read transducer 132 nor write transducer 134 is experiencing a level of protrusion caused by either protrusion controller. Surface 114 does not exhibit protrusion at either of a reader or a writer.

FIG. 3B shows slider 110 of FIG. 3A during operation of slider 110 to write data to magnetic recording medium 128 using write transducer 134. To reduce the distance (113) between a writer (a.k.a. "write transducer") 134 and surface 130, during a write operation, write protrusion controller 144 is actuated to cause protrusion of surface 114 at region 126, which is proximate and adjacent to write transducer 134. As shown, write protrusion controller 144, when actuated, causes protrusion of surface 114 at region 126, which includes write transducer 134, and the location of the protrusion does not extend to concomitantly cause an undue degree of protrusion of surface 114 at the location of write transducer 132. The side-by-side configuration and cross-track separation of read transducer 132 and write transducer 134, along with effects of spacer layer 160, are considered to reduce the potential of an unwanted effect of protrusion of surface 114 caused to occur near read transducer 132, due to the intended protrusion caused at region 126 during operation of write transducer 134 and writer protrusion controller 144.

FIG. 3C shows slider 110 of FIG. 3A during operation of slider 110 to read date from magnetic recording medium 128 using read transducer 132. To reduce the distance (113) between read transducer 132 and surface 130 during a read operation, read protrusion controller 142 is actuated to cause protrusion of surface 114 at region 127, which is proximate and adjacent to read transducer 132. As shown, read protrusion controller 142, when actuated, causes protrusion of surface 114 at region 127, which includes read transducer 132, and the location of the protrusion does not extend to concomitantly cause an undue degree of protrusion of surface 114 at the location of write transducer 134. The side-by-side configuration and cross-track separation of read transducer 132 and write transducer 134, along with a separation effect of spacer layer 160, are considered to reduce the potential of an unwanted effect of protrusion of surface 114 caused to occur near write transducer 134, due to the intended protrusion caused at region 127 during operation of read transducer 132 and read protrusion controller 142.

Figure 4:
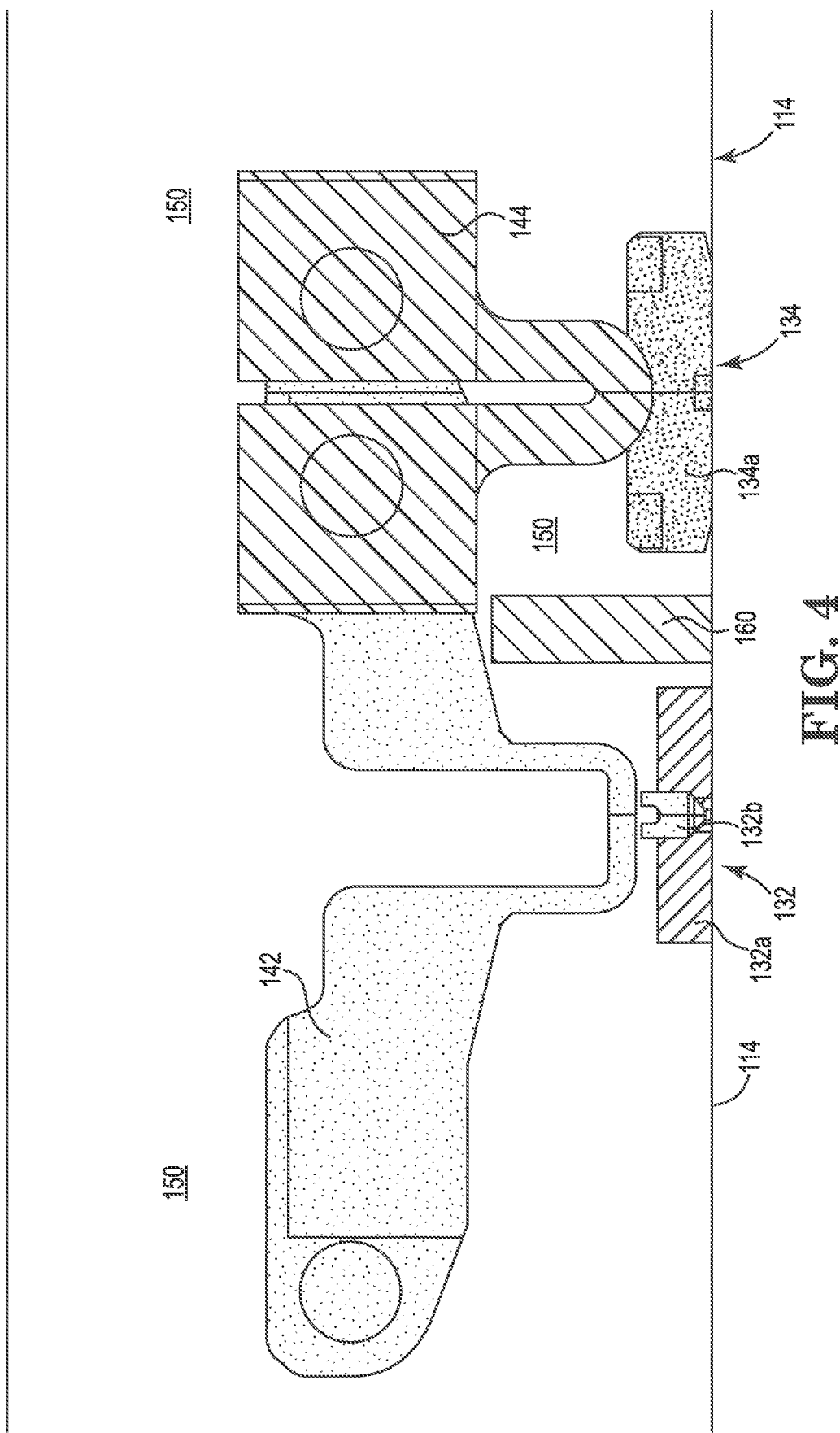
FIG. 4 is a cross-sectional view of a magnetic recording head as described, with details of feature of locations of read and write transducers.

FIG. 4 shows a somewhat more detailed illustration of an example slider (110) that includes read transducer 132 and write transducer 134 in a side-by-side configuration, as described. FIG. 4 is a cut-away view of slider 110 viewed in a down-track direction, toward a trailing end of slider 110. Slider 110 includes read transducer 132 and write transducer 134, each embedded in ceramic material 150 at trailing end surface 114. Also embedded in ceramic material 150 is spacer layer 160. Associated with each of read transducer 132 and write transducer 134 is read protrusion controller 142 (e.g., a heater) and write protrusion controller 144 (e.g., a heater), each of which can be actuated to cause protrusion (relative to surface 114) of read transducer 132 and, independently, to cause protrusion of write transducer 132, respectively. As illustrated at FIG. 4, slider 110 and structures thereof are shown with heaters 142 and 144 in a non-actuated state, such that neither of read transducer 132 nor write transducer 134 is experiencing a level of protrusion caused by either protrusion controller. Surface 114 does not exhibit protrusion at either of a reader or a writer.

As added details of an example slider 110, writer return pole 132a and writer 132b are illustrated as components of write transducer 132. Likewise, reader shields 134a are illustrated as components of read transducer 134.

Figure 5A:
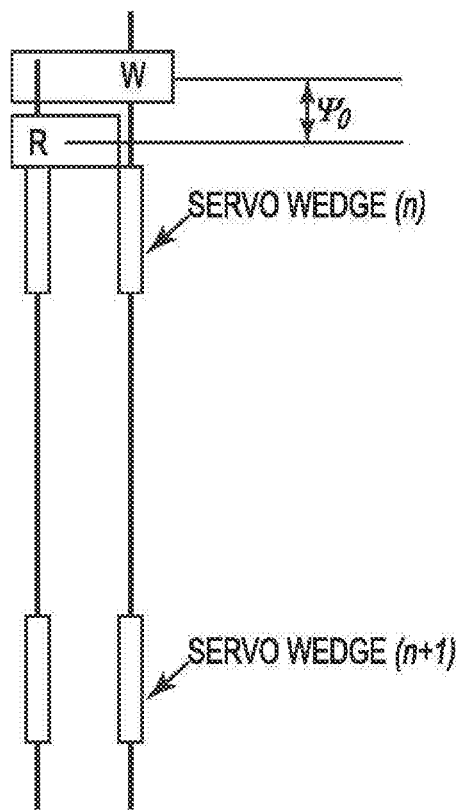
FIGS. 5A and 5B illustrate write performance characteristics of a magnetic recording head as described, compared to a non-inventive magnetic recording head.
Figure 5B:
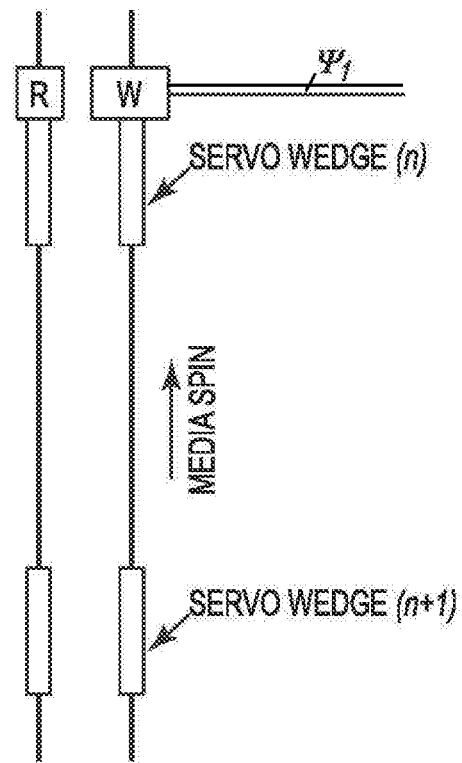

A magnetic recording head as described, that contains a read transducer and a write transducer situated in a side-by-side arrangement as described and illustrated herein, may in use provide useful or improved media servo format efficiency and areal density capabilities (ADC). Referring to FIGS. 5A and 5B, illustrated is a comparison of write capabilities of a magnetic recording head of the present description (FIG. 5B) that includes a side-by-side configuration of a read transducer and a write transducer, versus write capabilities of a non-inventive magnetic recording head (FIG. 5A).

Referring to FIG. 5A, a magnetic recording head includes a read transducer (R) and a write transducer (W) illustrated is a comparison of write capabilities of a magnetic recording head of the present description (FIG. 5B) that includes a write transducer and a read transducer that are positioned in a front-to-back configuration and not a side-by-side configuration as described herein. Using this magnetic recording head, track length $\Psi_0$, which is equal to a distance of down-track spacing between the read transducer and the write transducer on the recording head, is unable to be used for recording data because the write transducer is not able to be activated during activation of the read activator.

In contrast, as shown at FIG. 5B, the spacing in the down-track direction between a read transducer ("reader" R) and a write transducer ("writer" W) can be much smaller, e.g., less than 10 or 5 microns. The reduced spacing in the down-track direction reduces the unusable track length to a distance having a length $\Psi_1$, which is equal to a distance of down-track spacing between the read transducer (at center) and the write transducer (at center) on an inventive recording head that has a side-by-side configuration for a read transducer and a write transducer, and a reduced down-track spacing between the two transducers, e.g., less than 10, 5, or 3 microns, such as in a range from 1 to 3 or 1 to 5 microns.

Figure 6A:
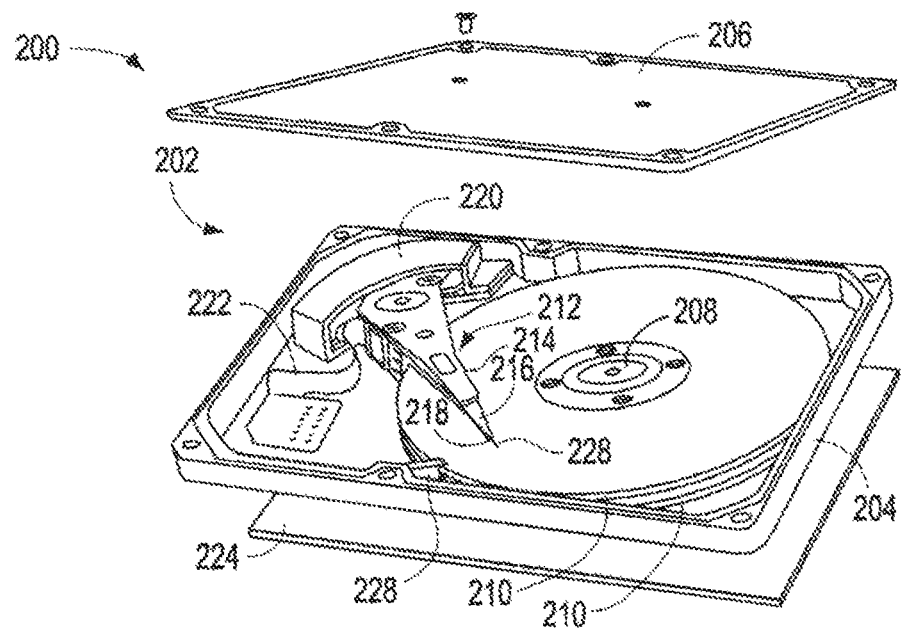
FIGS. 6A and 6B illustrate example hard disk drive components that may incorporate a magnetic recording head as described.
Figure 6B:
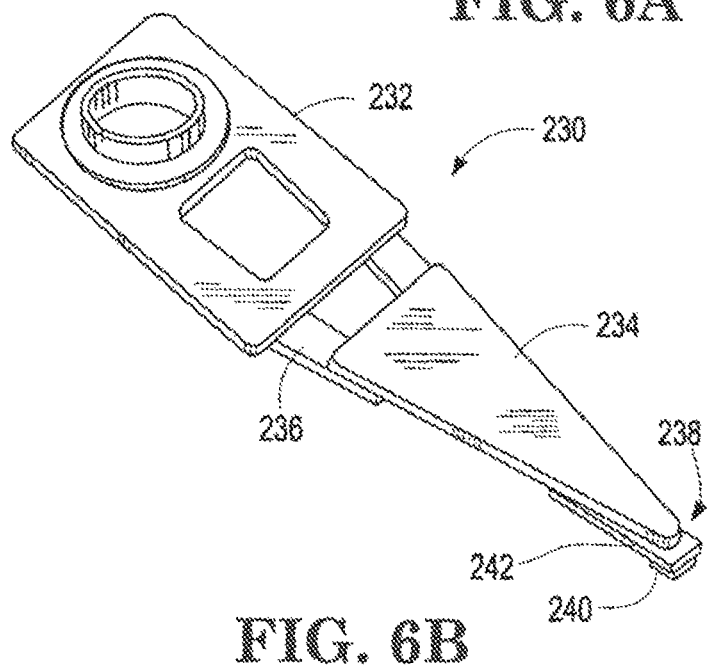

Examples of hard disk drives that contain a magnetic recording head as described are illustrated at FIGS. 6A and 6B. FIG. 6A is an exploded view of an exemplary data storage device 200. The device 200 includes a housing 202 formed from a base deck 204 and top cover 206. A gaseous atmosphere is retained within the housing, such as an air atmosphere or a low density, inert gas atmosphere (e.g., helium).

A spindle motor 208 is configured to rotate a number of storage media (e.g., magnetic discs) 210 at a selected high rotational velocity. An actuator assembly 212 includes rigid actuator arms 214, which support a corresponding array of flexible suspension assemblies (flexures) 216. At the end of each flexure 216 is a head gimbal assembly (HGA) 218. Each HGA includes a magnetic recording head that includes an air-bearing surface and a read and write transducer (as described herein) facing a surface of a magnetic disk, to allow the HGA to fly at a desired fly height above the associated surface. Read and write transducing elements are included in the magnetic recording head in a side-by-side configuration.

Actuator 212 is rotated by voice coil motor (VCM) 220. Electrically conductive signal paths are formed on a flexible printed circuit cable (flex circuit) 222, which couples the actuator 214 with a device printed circuit board (PCB) 224. The device PCB is mounted to an external surface of the base deck 104 and supports communication and control circuitry used by the device to interface with a host. In some embodiments, a ramp load tab 226 may project forward adjacent each HGA 218 to allow the HGAs to be unloaded from the media surfaces onto a ramp structure 228 when the device 200 is deactivated.

FIG. 3B is an isometric view of an exemplary suspension assembly 230. A base 232 supports a load beam 234 by way of a preload bend section 236. An HGA 238 is supported at a distal end of the load beam 234 and includes a magnetic recording head 240 and a gimbal plate 242.

The invention claimed is:

1. A recording head comprising:
   a bottom surface adapted to be oriented to face a magnetic recording medium surface during use, the bottom surface having:
   a down-track dimension between a leading end and a trailing end, and
   a cross-track dimension perpendicular to the down-track dimension,
   only one write transducer located at a location of the down-track dimension and the cross-track dimension, and
   a read transducer located at a location of the cross-track direction that is spaced a distance of at least 10 microns from the location of the write transducer in the cross-track dimension.

2. A recording head according to claim 1 wherein the read transducer is spaced a distance of from 10 to 100 microns from the write transducer in the cross-track direction.

3. A recording head according to claim 1 wherein the read transducer is spaced a distance of less than 50 microns from the write transducer in the down-track direction.

4. A recording head according to claim 1 comprising:
   a write protrusion controller adapted to selectively cause protrusion of the write transducer,
   a read protrusion controller adapted to selectively cause protrusion of the read transducer, or
   both.

5. A recording head of claim 1 comprising:
   a read actuator that comprises a heater adapted to cause protrusion of the read transducer, and
   a write actuator that comprises a heater adapted to cause protrusion of the read transducer.

6. A recording head of claim 1 comprising a spacer layer located between the read transducer and the write transducer.

7. A recording head of claim 6, comprising ceramic that surrounds the read transducer and the write transducer, wherein the ceramic comprises aluminum oxide.

8. A recording head of claim 6, wherein the spacer layer comprises spacer material that exhibits one or more of: a lower stiffness compared to the ceramic, a lower coefficient of thermal expansion compared to the ceramic, and a lower thermal conductivity compared to the ceramic, and wherein the spacer material comprises glassy alumina, glassy silicon dioxide, polymer, or photoresist material.

9. A recording head of claim 6, wherein the spacer layer comprises spacer material that exhibits one or more of: a lower stiffness compared to the ceramic, a lower coefficient of thermal expansion compared to the ceramic, and a lower thermal conductivity compared to the ceramic, and wherein the spacer material comprises polyimide.

10. A recording head of claim 7 wherein the spacer material exhibits:
- thermal conductivity that is less than thermal conductivity of ceramic,
- a higher elasticity compared to elasticity of ceramic material, or
- a coefficient of thermal expansion that is lower than a coefficient of thermal expansion of ceramic material.

11. A recording head of claim 7 wherein the spacer material exhibits a Young's Modulus that is below 60 gigapascals (GPa).

12. A recording head of claim 7 wherein the spacer material exhibits a thermal conductivity below about 2 watts per meter-K (W/m-K).

13. A recording head of claim 7 wherein the spacer material exhibits a coefficient of thermal expansion that is below about $10 \times 10^{-6}$/K.

14. A hard disk drive comprising a recording head of claim 1.

15. A method of using a hard disk drive of claim 14, the method comprising:
- writing data magnetically to a magnetic recording medium using the write transducer, and
- reading the data using the read transducer.

16. A recording head comprising:
- a bottom surface adapted to be oriented to face a magnetic recording medium surface during use, the bottom surface having:
  - a down-track dimension between a leading end and a trailing end, and
  - a cross-track dimension perpendicular to the down-track dimension,
- a write transducer located at a location of the down-track dimension and the cross-track dimension,
- a read transducer located at a location of the cross-track direction that is spaced a distance of at least 10 microns from the location of the write transducer in the cross-track dimension, and
- ceramic that surrounds the read transducer and the write transducer, and a spacer layer located between the read transducer and the write transducer, the spacer layer comprising spacer material that exhibits one or more of: a lower stiffness compared to the ceramic, a lower coefficient of thermal expansion compared to the ceramic, and a lower thermal conductivity compared to the ceramic.

17. A recording head of claim 16, wherein the write transducer and the read transducer are in a side-by-side configuration.

18. A recording head of claim 16, wherein the spacer material comprises glassy alumina, glassy silicon dioxide, polymer, or photoresist material.

19. A recording head of claim 16, wherein the spacer material comprises polyimide.

20. A recording head of claim 16, wherein the spacer material exhibits:
- thermal conductivity that is less than thermal conductivity of ceramic,
- a higher elasticity compared to elasticity of ceramic material, or
- a coefficient of thermal expansion that is lower than a coefficient of thermal expansion of ceramic material.

* * * * *